(12) United States Patent
Yamamoto et al.

(10) Patent No.: US 11,187,829 B2
(45) Date of Patent: Nov. 30, 2021

(54) OPTICAL ELEMENT, METHOD FOR MANUFACTURING THE SAME, AND OPTICAL APPARATUS

(71) Applicant: CANON KABUSHIKI KAISHA, Tokyo (JP)

(72) Inventors: Shuhei Yamamoto, Tokyo (JP); Norihiko Ochi, Kawasaki (JP); Junri Ishikura, Tokyo (JP); Takeaki Kumagai, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 265 days.

(21) Appl. No.: 16/152,154

(22) Filed: Oct. 4, 2018

(65) Prior Publication Data
US 2019/0107648 A1    Apr. 11, 2019

(30) Foreign Application Priority Data

Oct. 10, 2017 (JP) .............................. JP2017-196991
Sep. 5, 2018 (JP) .............................. JP2018-165935

(51) Int. Cl.
| | | |
|---|---|---|
| *G02B 1/111* | (2015.01) | |
| *C09D 5/00* | (2006.01) | |
| *C09D 163/00* | (2006.01) | |
| *G02B 7/02* | (2021.01) | |
| *G02B 3/00* | (2006.01) | |
| *G02B 1/10* | (2015.01) | |
| *G02B 5/00* | (2006.01) | |

(52) U.S. Cl.
CPC ................ *G02B 1/111* (2013.01); *C09D 5/00* (2013.01); *C09D 5/002* (2013.01); *C09D 163/00* (2013.01); *G02B 1/10* (2013.01); *G02B 3/00* (2013.01); *G02B 5/003* (2013.01); *G02B 7/021* (2013.01)

(58) Field of Classification Search
CPC .. G02B 1/111; G02B 3/00; G02B 1/10; G02B 5/003; G02B 7/021; C09D 5/00; C09D 163/00; C09D 5/002
USPC ............................................ 359/601
See application file for complete search history.

(56) References Cited

U.S. PATENT DOCUMENTS

| | | | | |
|---|---|---|---|---|
| 2014/0160571 A1* | 6/2014 | Miyazaki | ................ | G02B 3/00 359/614 |
| 2015/0168742 A1* | 6/2015 | Hoshino | ................ | G02C 7/00 351/159.57 |
| 2016/0024335 A1* | 1/2016 | Yamamoto | ............... | C08K 3/22 428/417 |

FOREIGN PATENT DOCUMENTS

JP          2016-30706 A          3/2016

OTHER PUBLICATIONS

Cosmetics Info webpage "Methoxyisopropyl Acetate" https://cosmeticsinfo.org/ingredient/methoxyisopropyl-acetate (Year: 2017).*

* cited by examiner

*Primary Examiner* — George G King
(74) *Attorney, Agent, or Firm* — Canon U.S.A., Inc. IP Division

(57) ABSTRACT

An optical element includes a substrate having an optically effective surface and an optically non-effective surface, and a light shielding film disposed over the optically non-effective surface. The optically non-effective surface has an inclined chamfer and a level chamfer that define a ridge portion. The ridge portion is coated with an aliphatic hydrocarbon.

18 Claims, 4 Drawing Sheets

OPTICAL ELEMENT, METHOD FOR MANUFACTURING THE SAME, AND OPTICAL APPARATUS

BACKGROUND OF THE INVENTION

Field of the Invention

The present disclosure relates to an optical element used in optical apparatuses, such as an interchangeable lens of a single-lens reflex camera and, particularly, to an optical element including a substrate having an inclined chamfer and a level chamfer and a light shielding film disposed over a portion of the substrate. The present disclosure also relates to a method for manufacturing the optical element.

Description of the Related Art

In an optical element, such as a lens or a prism, used in an optical apparatus such as a camera or a microscope, stray light is produced by surface reflection or internal reflection of incoming light. Stray light causes flaring or ghosts, reducing the optical performance of the optical apparatus. In order to prevent surface reflection or internal reflection, optical elements are provided with a light shielding antireflection film that is formed by applying a light shielding paint onto the edge of the substrate or the edge of the optically effective surface of the substrate.

Also, the substrates of many of the optical elements are made of a vitreous material having as high a refractive index as 1.80 to 2.00 or more than 2.00 along with the recent trend to compact, high-performance optical apparatuses. If the peripheral surface or the like of an optical element made of such a high-refractive-index material is provided with a light shielding film formed by applying a light shielding paint onto the peripheral surface, whitish bright spots (white spots) are formed at the interface between the substrate and the light shielding film, degrading the quality in appearance of the optical element. The white spots are produced by reflected light (scattered light) caused by a difference in refractive index between the substrate and voids or cavities formed in the light shielding film filling the cracks formed in the peripheral surface of the substrate when the substrate is cut.

Japanese Patent Laid-Open No. 2016-30706 discloses an optical element from which white spots is reduced by controlling the drying speed of the light shielding paint so as to sufficiently fill the cracks with the light shielding paint, thus suppressing scattering of light coming from the outside.

In this optical element, the ridge portion (and the vicinity thereof) defined by the inclined chamfer and the level chamfer are not easily subjected to additional treatment to eliminate cracks compared to the other portion of the peripheral surface, and many cracks remain the ridge portion. In addition, the light shielding paint applied onto the ridge portion flows out of the ridge portion due to the surface tension thereof, thus reducing the thickness of the coating of the paint. Accordingly, the thin portion of the coating dries rapidly before the paint completely fill the cracks, thus forming voids or cavities in the cracks.

SUMMARY OF THE INVENTION

Accordingly, the present disclosure provides an optical element from which white spots at the ridge portion defined by an inclined and a level chamfer of the substrate are reduced.

According to an aspect of the present disclosure, there is provided an optical element including a substrate having an optically effective surface and an optically non-effective surface having an inclined chamfer and a level chamfer that define a ridge portion, the ridge portion being coated with an aliphatic hydrocarbon, and a light shielding film disposed over the ridge portion.

Further features of the present disclosure will become apparent from the following description of exemplary embodiments with reference to the attached drawings.

DESCRIPTION OF THE EMBODIMENTS

Exemplary embodiments of the present disclosure will now be described in detail with reference to the drawings.

Substrate

Figure 1A:
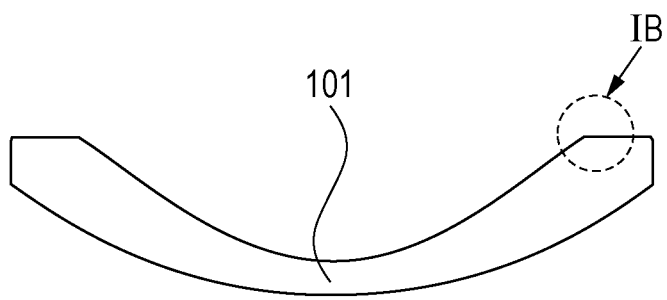
FIGS. 1A and 1B are each a schematic illustrative representation of the substrate of an optical element according to an embodiment of the present disclosure.
Figure 1B:
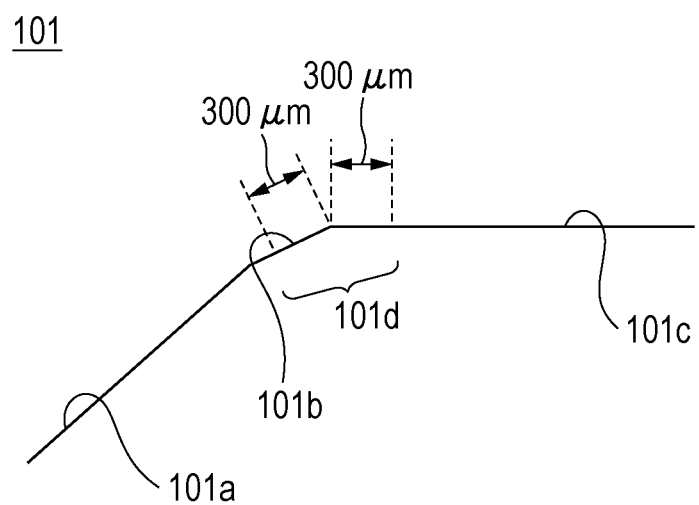

The substrate of the optical element according to an embodiment of the present disclosure may be an optical lens or prism having an optically effective surface extending from the center thereof, an optically non-effective surface between the optically effective surface and the edge of the substrate. The optically non-effective surface has an inclined chamfer and a level chamfer. The substrate may be made of, for example, non-alkali glass, alumina silica glass, borosilicate glass, quartz glass, barium oxide-containing glass, lanthanum oxide-containing glass, or titanium oxide-containing glass. FIG. 1A is a schematic illustrative representation of the substrate 101 of an optical element according to an embodiment of the present disclosure, and FIG. 1B is an enlarged representation of the portion surrounded by a dotted line in FIG. 1A. As shown in FIG. 1B, the substrate 101 has an optically effective surface 101a, and an inclined chamfer 101b and a level chamfer 101c that are formed by cutting or grinding and each a part of the optically non-effective surface. In the present disclosure, the ridge portion 101d defined by the inclined chamfer 101b and the level chamfer 101c of the substrate 101 refers to the regions on both sides up to 300 μm from the edge formed by the inclined chamfer 101b and the level chamfer 101c. Since the inclined chamfer 101b and the level chamfer 101c of the substrate used in the optical element of the present disclosure are cut or ground, cracks with a length of 50 μm or less and a depth of about 5 μm to 10 μm are formed in the ridge portion.

Light Shielding Film and Aliphatic Hydrocarbon

Figure 2A:
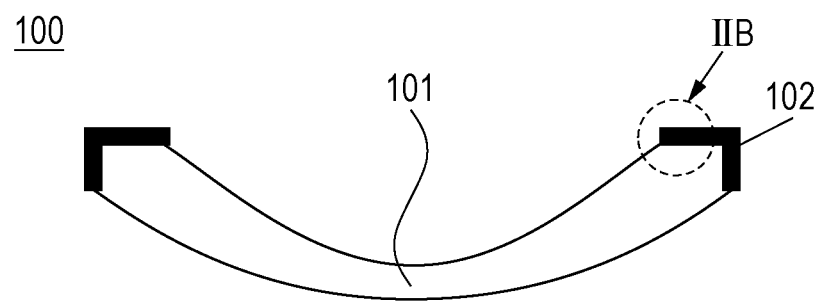
FIGS. 2A and 2B are each a schematic illustrative representation of an optical element according to an embodiment of the present disclosure.
Figure 2B:
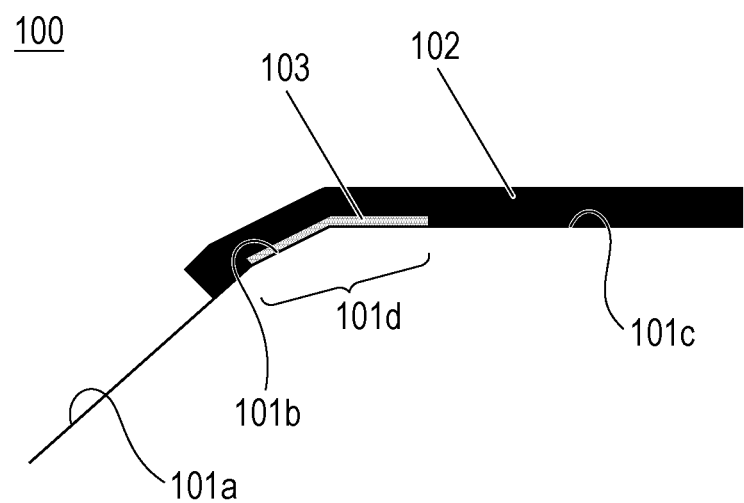

FIGS. 2A and 2B are each a schematic illustrative representation of an optical element according to an embodiment of the present disclosure. In the optical element shown in FIG. 2A, the substrate 101 is provided with a light shielding film 102 on a portion of the substrate. A shown in FIG. 2B, which is an enlarged representation of the portion surrounded by a dotted line in FIG. 2A, the light shielding film 102 is disposed over the optically non-effective surface of the substrate including the ridge portion 101d. Also, an aliphatic hydrocarbon 103 is applied between the substrate 101 and the light shielding film 102.

The aliphatic hydrocarbon 103 is lipophilic and compatible with the light shielding paint that is the precursor of the light shielding film (described herein later). The aliphatic hydrocarbon 103 therefore helps the light shielding paint to enter the cracks in the ridge portion of the substrate and sufficiently fill the cracks. Thus, the aliphatic hydrocarbon 103 suppresses the thinning of the light shielding film formed over the ridge portion and contributes to achieving a good-looking optical element in which white spots at the ridge portion are reduced.

In some embodiments, the amount of the aliphatic hydrocarbon 103 applied onto the ridge portion 101d defined by the inclined chamfer 101b and the level chamfer 101c may be larger than that of the aliphatic hydrocarbon 103 applied onto the other portion of the substrate. In this instance, the flow out of the ridge portion of the light shielding paint due to the surface tension is reduced, so that the light shielding paint can sufficiently fill the cracks in the ridge portion of the substrate. If a large amount of the aliphatic hydrocarbon 103 is present on the portions other than the ridge portion 101d, it is difficult to control the surface tension of the light shielding paint over the ridge portion 101d. Consequently, the paint over the ridge portion 101d dries rapidly and is not likely to sufficiently fill the cracks. If a large amount of the aliphatic hydrocarbon 103 is present on the portion other than the ridge portion 101d, furthermore, the refractive index of the entire light shielding film may be reduced, reducing the optical performance of the light shielding film. In some embodiments, the aliphatic hydrocarbon 103 may be applied onto only the ridge portion 101d defined by the inclined chamfer 101b and the level chamfer 101c.

In some embodiments, the aliphatic hydrocarbon 103 may be a saturated hydrocarbon (alkane). This is because alkanes are compatible with the light shielding paint. Alkanes are represented by a general formula $C_nH_{2n+2}$ (n is an integer) and have a chain structure. Exemplary alkanes include methane, ethane, propane, butane, pentane, hexane, heptane, octane, nonane, and decane.

In some embodiments, the carbon number of the saturated hydrocarbon may be 6 to 30. Saturated hydrocarbons having a carbon number in this range facilitate favorable application of the light shielding paint. If the carbon number is less than 6, the light shielding paint is not good in wettability and does not sufficiently coat the substrate. In contrast, if the carbon number exceeds 30, the saturated hydrocarbon may cause lumps to be formed in the light shielding paint. The lumps, which will remain in the light shielding film, degrades the optical performance of the resulting optical element.

As shown in FIG. 2B, the light shielding film 102 is disposed over the optically non-effective surface including the ridge portion 101d to prevent stray light. The light shielding film 102 may be extended to a portion of the optically effective surface 101a so as to obscure the boundary between the optically effective surface 101a and the optically non-effective surface. The portion of the light shielding film 102 disposed on the optically effective surface 101a has a width of several hundreds of micrometers, and this width is beneficially constant. This is to suppress the degradation of optical performance.

In some embodiments of the present disclosure, the thickness of the light-shielding film may be in the range of 1.0 µm to 50 µm or 1.0 µm to 4.9 µm over the ridge portion 101d. Beneficially, the thickness is constant. If the thickness is as small as less than 1.0 µm, the light shielding film may not sufficiently absorb light, not exhibiting satisfactory light shielding effect. In addition, the light shielding paint may not sufficiently fill the cracks, forming cavities (air holes) in the cracks filled with the paint. In contrast, the light shielding film having a thickness of 50 µm or more raises the risk of cracking under high-temperature, high-humidity environment.

The light shielding film 102 contains a resin, inorganic fine particles, and a coloring agent.

The resin used in the light shielding film 102 may be a thermosetting resin selected from the group consisting of epoxy resin, alkyd resin, and acrylic resin. Epoxy resin may be selected because it is stable in dimensions.

The inorganic fine particles are intended to control the refractive index of the light shielding film 102. The material of the inorganic fine particles may be titanium oxide, zirconium oxide, cerium oxide, tin oxide, or the like. In some embodiments, titanium oxide may be selected because it has a high refractive index.

The coloring agent may be a dye or a pigment. A dye may be selected from the viewpoint of uniformly dispersing the coloring agent in the light shielding film 102. If a pigment is used, the pigment may be at least one pigment selected from the group consisting of carbon black, copper-iron-manganese composite oxide, titanium black, copper oxide, and iron oxide (colcothar). If a dye is used, the dye may be selected from the group consisting of anthraquinone dye, phthalocyanine dye, stilbene dye, pyrazolone dye, thiazole dye, carbonium dye, and azine dye. The dye content in the light shielding film may be in the range of 13.0 parts by mass to 50.0 parts by mass or 13.0 parts by mass to 40.0 parts by mass relative to 100 parts by mass of the light shielding film, if the coloring agent consists of one or more dyes.

Light Shielding Paint

The light shielding paint used for forming the light shielding film may be, but is not limited to, a resin composition containing a resin, an inorganic fine particles, and a coloring agent. The resin may be adherent to the material of the substrate, such as glass. For example, such resins include epoxy resin, alkyd resin, and acrylic resin. From the viewpoint of increasing the refractive index of the light shielding film, a resin having a high refractive index may be used. The resin content may be in the range of 10 parts by mass to 60 parts by mass relative to 100 parts by mass of the light shielding paint.

The inorganic fine particles may have a refractive index (nd) of 2.2 or more from the viewpoint of reducing internal reflection. Exemplary materials of the inorganic fine particles include titanium oxide, zirconium oxide, cerium oxide, and tin oxide. The average particle size of the inorganic fine particles may be in the range of 10 nm to 100 nm. The inorganic fine particle content may be in the range of 5 parts by mass to 35 parts by mass relative to 100 parts by mass of the light shielding paint.

The coloring agent may be a dye or a pigment provided that it can absorb visible light in a wavelength region of 400 nm to 700 nm and is soluble in a solvent. If a pigment is used, the pigment may be carbon black, titanium black, copper oxide, or iron oxide (colcothar). If a dye is used, the dye may be anthraquinone dye, phthalocyanine dye, stilbene dye, pyrazolone dye, thiazole dye, carbonium dye, or azine dye. The coloring agent may contain a single component or may be a mixture of plural types of coloring agent for black, red, yellow, blue, and the like. The coloring agent content may be in the range of 5 parts by mass to 35 parts by mass relative to 100 parts by mass of the light shielding paint.

The beneficial solvent for the light shielding paint may be such that it can dissolve the resin, the coloring agent, and other constituents and is, more beneficially, miscible with the inorganic particles. The organic solvent content may be in the range of 5 parts by mass to 70 parts by mass relative to 100 parts by mass of the light shielding paint.

Silicon dioxide fine particles capable of facilitating favorable application of the light shielding paint or a hardener or may be further added. The hardener may be a compound selected from among amine-based compounds, acid anhydride-based compounds, and imidazole-based compounds.

From the viewpoint of forming a coating having a uniform thickness, the viscosity of the light shielding paint may be in the range of 10 mPa·s to 100 mPa·s. Also, the surface tension of the light shielding paint may be in the range of 5 N/m to 50 N/m. The viscosity and the surface tension may be adjusted to the above ranges by diluting the light shielding paint with a solvent provided that the optical properties of the paint are not degraded.

Method for Manufacturing Optical Element

The method for manufacturing the optical element of the present disclosure includes applying a coating liquid containing an aliphatic hydrocarbon onto the ridge portion defined by the inclined chamfer and the level chamfer, and applying a light shielding paint onto the ridge portion, followed by completing the formation of the light shielding film.

The application of the light shielding paint onto the ridge portion of the substrate may be performed by dip coating, spin coating, slit coating, or electrostatic coating or by using an application tool such as a brush, a sponge, or a bar coater, depending on the shape of the coating. From the viewpoint of easily controlling the amount of the paint to be applied onto the substrate, a dispenser may be used.

The application of the coating liquid containing an aliphatic hydrocarbon onto the ridge portion may be performed by a known manner using an application tool, for example, a brush, a sponge, or an elastic tool such as a wire or a blade, depending on the ridge portion to be coated. For example, the coating tool may be soaked with the coating liquid containing an aliphatic hydrocarbon, and the coating liquid is applied with the coating tool. The coating tool may be made of any material and is not particularly limited provided that the coating liquid containing an aliphatic hydrocarbon can be applied onto the ridge portion. For example, the material may be a resin such as nylon or a metal such as aluminum, copper, steel, or tungsten. The coating liquid containing an aliphatic hydrocarbon and the light shielding paint may be applied onto the ridge portion at one time.

The application of the light shielding paint onto the ridge portion and the application of the paint onto the entire peripheral surface except the ridge portion may be performed in any manner without particular limitation. For example, either application may be performed by dip coating, spin coating, slit coating, or electrostatic coating or by using an application tool such as a brush, a sponge, or a bar coater, depending on the shape of the coating. However, it is not desirable that the light shielding paint applied (or to be applied) onto the peripheral surface other than the ridge portion be mixed with the aliphatic hydrocarbon.

After the application of the light shielding paint, the paint is dried and/or baked to yield the light shielding film. How the light shielding paint is dried and/or baked depends on the desired properties of the optical element and the type and the amount of the hardener added to the paint.

The drying temperature may be 100° C. or less, for example in the range of 40° C. to 80° C. or 40° C. to 60° C. The period for drying may be in the range of 10 minutes to 24 hours, for example, 30 minutes to 24 hours or 1 hour to 24 hours.

The baking temperature may be in the range of 40° C. to 300° C., for example in the range of 40° C. to 250° C. or 40° C. to 200° C. The period for baking may be in the range of 10 minutes to 10 hours, for example, in the range of 10 minutes to 6 hours.

Optical Apparatus

The optical apparatus according to an embodiment of the present disclosure will now be described. The optical apparatus includes an enclosure and an optical system including a plurality of lenses disposed in the enclosure. In this optical apparatus, the optical element described above is disposed, as one of the lenses, close to the light entrance of the optical system.

Figure 4:
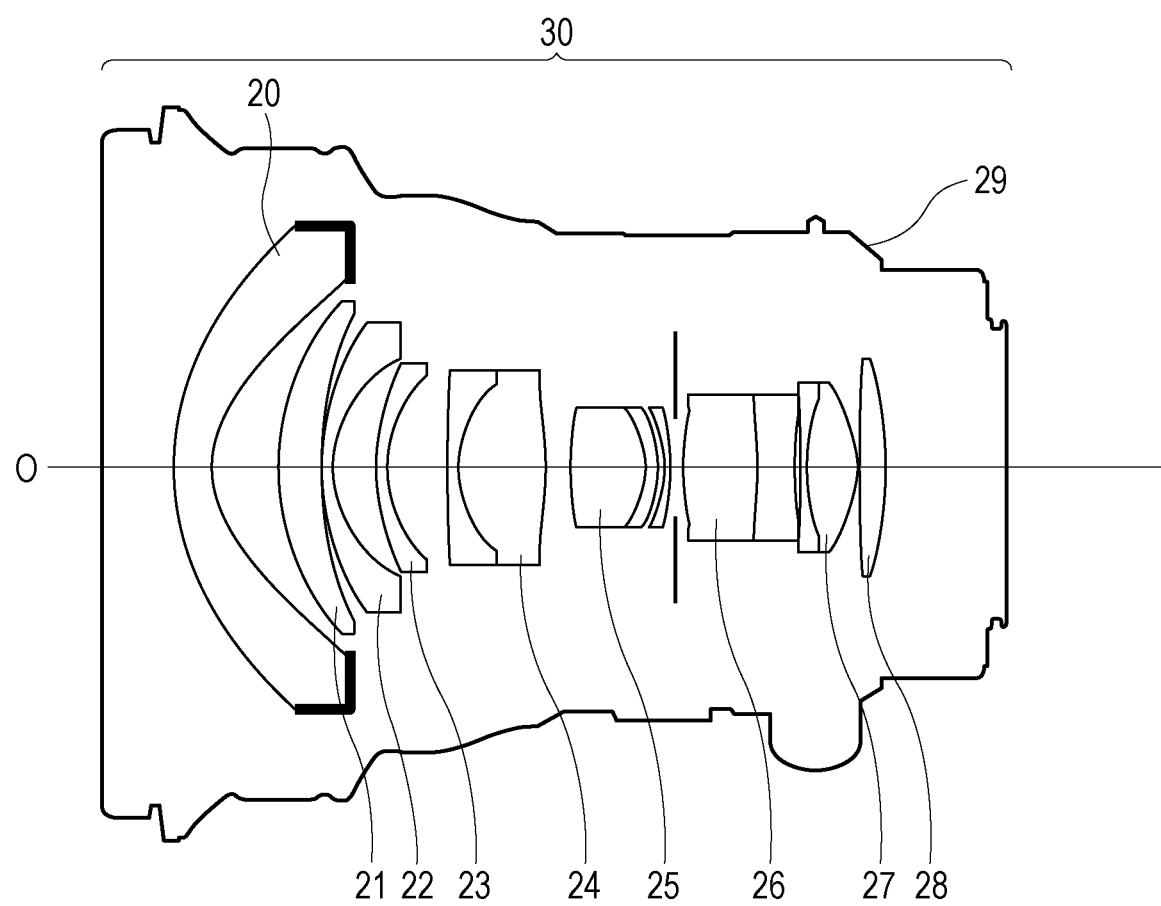
FIG. 4 is a schematic view of an optical apparatus according to an embodiment of the present disclosure.

FIG. 4 is a sectional view of the optical system of an interchangeable lens barrel of a single-lens reflex camera. The interchangeable lens is an implementation of the optical apparatus according to the present disclosure. The lens barrel 30 includes an enclosure 29 and an optical system in the enclosure. The optical system includes lenses 21 to 28 and a lens 20 that is an optical element according to an embodiment of the present disclosure, each disposed perpendicular to the optical axis O. The side toward the lens 20 is the side from which light enters the optical system, and the side toward the lens 28 is the side on which the lens barrel is mounted on or removed from the camera. The optical element of the present disclosure is disposed as the lens 20 on the light entrance side of the optical system of the lens barrel, so that white spots are reduced. Thus, the lens barrel is good in appearance.

The optical element of the present disclosure may be used in general optical apparatuses, such as cameras, binoculars, microscopes, and semiconductor exposures, each including an optical system including a plurality of lenses.

EXAMPLES

Examples of the subject matter of the present disclosure will now be described.

The samples of the Examples and Comparative Examples were evaluated as described below.

Thickness Measurement of Light Shielding Film Over Ridge Portion

The volume of the portion of the light shielding film over the ridge portion defined by the inclined chamfer and the level chamfer was estimated by measuring the cross-sectional profiles of the optical element before and after forming the light shielding film with a two-dimensional laser displacement meter LJ-V7020 (manufactured by Keyence).

The thickness t [μm] of the portion of the light shielding film over the ridge portion was calculated by dividing the estimated volume by the total area of the inclined chamfer and the level chamfer.

Analysis of Aliphatic Hydrocarbon Over Ridge Portion

Whether or not the aliphatic hydrocarbon is present on the ridge portion defined by the inclined chamfer and the level chamfer was examined with a gas chromatograph mass spectrometer (Trace GC Ultra+ISQ-LT+TriPlus 300 manufactured by Thermo Fisher Scientific and PY-3030D manufactured by Frontier Laboratories). More specifically, components separated by gas chromatography were subjected to mass analysis to obtain a mass spectrum for quantitatively analysis.

Evaluation of Appearance in Whitish Bright Spots

While the optical element provided with the light shielding film was irradiated with light, whitish bright spots observed at the interface between the substrate and the light shielding film were photographed. The photograph was image-processed by an image analysis software program Image-Pro Plus (produced by Media Cybernetics), and whitish bright spots having an area of 150 µm² or more at the ridge portion were counted. When the number of white spots at the ridge portion was 20 or less, the appearance of the optical element was graded as A; when the number of white spots was 21 to 40, the appearance was graded as B; and when the number of white spots was 41 or more, the appearance was graded as C.

Example 1

Example 1 will be described in detail below.
Preparation of Light Shielding Paint First, 7 g of an epoxy resin jER828 (produced by Mitsubishi Chemical) and 40 g of a titania dispersion liquid ND139 (25% by mass titania in propylene glycol monomethyl ether (PGME) produced by Tayca) were prepared. Also, 1.2 g of dye (1), VALIFAST-BLACK 3810 (produced by Orient Chemical Industries), and 3.0 g of dye (2), VALIFAST-RED 3320 (produced by Orient Chemical Industries), were prepared. In addition, 1.2 g of dye (3), VALIFAST-YELLOW 3108 (produced by Orient Chemical Industries), and 3.8 g of dye (4), VALIFAST-BLUE 2620 (produced by Orient Chemical Industries), were prepared. For the organic solvent, 22 g of 1-methoxy-2-propanol (produced by Kishida Chemical) was prepared. Furthermore, 3.2 g of hydrophobic silica (1), Aerosil R972 (produced by Nippon Aerosil), and 1.3 g of hydrophilic silica (2), Aerosil 200 (produced by Nippon Aerosil), were prepared. ALSO, A fungicide, 0.5 g of Synthol M-100 (produced by SC Environmental Science), was prepared.

The constituents prepared above were added into a vessel for stirring, and the contents in the vessel were stirred for 20 minutes with a planetary mixer HM-500 (manufactured by Keyence). Into 10 g of the resulting composition was added 1 g of an epoxy resin hardener H-30 (produced by Mitsubishi Chemical), and the mixture was stirred for 3 minutes with the planetary mixer HM-500 (manufactured by Keyence) to yield a light shielding paint.
Production of Optical Element First, a resin wire (240 µm in diameter) was soaked in hexane (produced by Tokyo Chemical Industry), which has a carbon number of 6 and was to be used as the coating liquid containing an aliphatic hydrocarbon. The resin wire soaked with hexane was pressed on the ridge portion defined by the inclined chamfer and the level chamfer, and, in this state, the substrate was spun at a rotational speed of 100 rpm to apply the hexane onto the ridge portion. Subsequently, the light shielding paint was dropped onto the ridge portion from a dispenser. In this instance, the volume of the light shielding paint per dot was 15 nL, and 20 dots of the light shielding paint were applied at regular intervals.

Next, the light shielding paint was continuously dropped onto the optically non-effective portion of the substrate other than the ridge portion from the dispenser. Subsequently, the substrate was spun at a rotational speed of 100 rpm with the resin wire pressed on the ridge portion. Then, after being dried at room temperature for 1 hour, the coating was baked at a constant temperature of 80° C. for 2 hours in a furnace to yield a light shielding film. Thus, the optical element of Example 1 was produced.

Evaluation of Ridge Portion

The thickness t [µm] of the portion of the light shielding film over the ridge portion of the resulting optical element was measured, and, from the measurements, the thickness was estimated to be 3.9 µm. Next, the appearance of the ridge portion was evaluated in terms of whitish bright spots. The number of white spots at the ridge portion was 17. Then, the ridge portion was examined as described below.

Figure 3A:
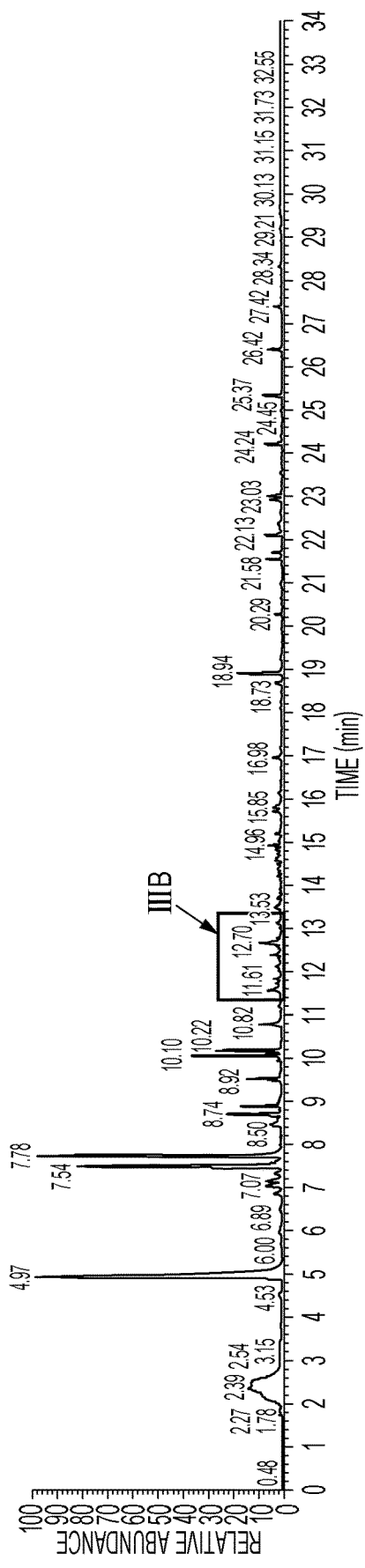
FIGS. 3A and 3B are each a chart of gas chromatography-mass spectrometry analysis of the optical element of Example 1 according to the present disclosure.
Figure 3B:
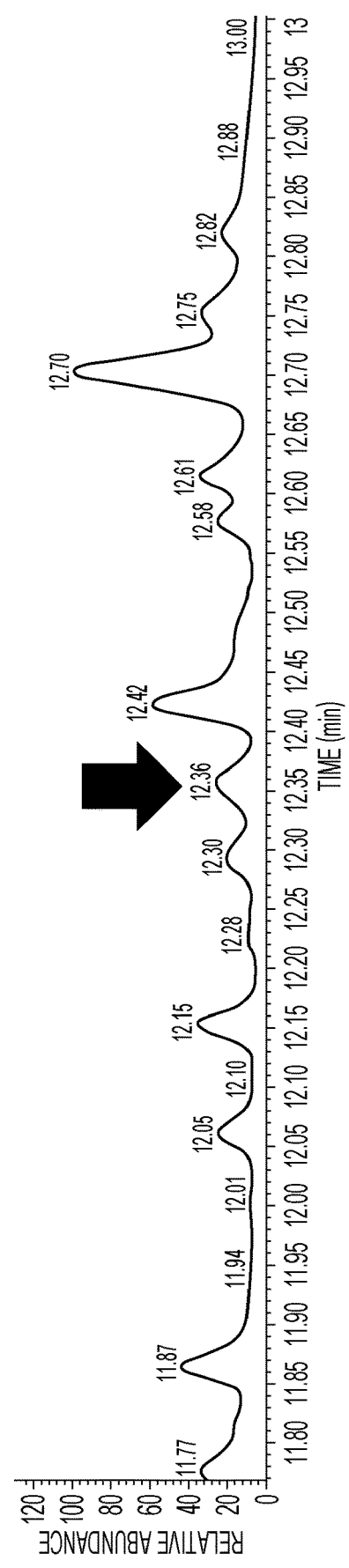

The optical element of Example 1 was cut into a test piece including the ridge portion defined by the inclined chamber and the level chamfer and a test piece not including the ridge portion. Each test piece was heated to 300° C. in the gas chromatograph mass spectrometer. The gas generated by the heating was analyzed to check whether or not the aliphatic hydrocarbon applied to the ridge portion was present in the gas. FIG. 3A is the result of qualitative analysis of the gas components generated from the portion of the light shielding film formed over the ridge portion by gas chromatography. FIG. 3B is a fragmentary enlarged chart of FIG. 3A. As designated by the arrow in FIG. 3B, a peak derived from a saturated hydrocarbon was detected in the test piece including the ridge portion of the optical element of Example 1. On the other hand, in the other test piece, not including the ridge portion, a peak derived from the aliphatic hydrocarbon was not detected. The light shielding paint and the coating liquid containing an aliphatic hydrocarbon are shown in Table 1, and the evaluation results of the optical element are shown in Table 4.

Example 2

The optical element of Example 2 was produced in the same manner as in Example 1 except for using n-octane (produced by Tokyo Chemical Industry) having a carbon number of 8 as the coating liquid containing an aliphatic hydrocarbon. The light shielding paint and the coating liquid containing an aliphatic hydrocarbon are shown in Table 1, and the evaluation results of the optical element are shown in Table 4.

Example 3

The optical element of Example 3 was produced in the same manner as in Example 1 except for using decane (produced by Tokyo Chemical Industry) having a carbon number of 10 as the coating liquid containing an aliphatic hydrocarbon. The light shielding paint and the coating liquid containing an aliphatic hydrocarbon are shown in Table 1, and the evaluation results of the optical element are shown in Table 4.

Example 4

The optical element of Example 4 was produced in the same manner as in Example 1 except for using tridecane (produced by Tokyo Chemical Industry) having a carbon number of 13 as the coating liquid containing an aliphatic hydrocarbon. The light shielding paint and the coating liquid containing an aliphatic hydrocarbon are shown in Table 1, and the evaluation results of the optical element are shown in Table 4.

Example 5

The optical element of Example 5 was produced in the same manner as in Example 1 except for using pentacosane (produced by Sigma-Aldrich) having a carbon number of 25 as the coating liquid containing an aliphatic hydrocarbon. The light shielding paint and the coating liquid containing an aliphatic hydrocarbon are shown in Table 2, and the evaluation results of the optical element are shown in Table 4.

Example 6

The optical element of Example 6 was produced in the same manner as in Example 1 except for using triacontane (produced by Sigma-Aldrich) having a carbon number of 30 as the coating liquid containing an aliphatic hydrocarbon. The light shielding paint and the coating liquid containing an aliphatic hydrocarbon are shown in Table 2, and the evaluation results of the optical element are shown in Table 4.

Example 7

The optical element of Example 7 was produced in the same manner as in Example 1 except for using pentane (produced by Tokyo Chemical Industry) having a carbon number of 5 as the coating liquid containing an aliphatic hydrocarbon. The light shielding paint and the coating liquid containing an aliphatic hydrocarbon are shown in Table 2, and the evaluation results of the optical element are shown in Table 4.

Example 8

The optical element of Example 8 was produced in the same manner as in Example 1 except for using hentriacontane (produced by Sigma-Aldrich) having a carbon number of 31 as the coating liquid containing an aliphatic hydrocarbon. The light shielding paint and the coating liquid containing an aliphatic hydrocarbon are shown in Table 2, and the evaluation results of the optical element are shown in Table 4.

Comparative Example 1

In Comparative Example 1, the light shielding film was formed by applying the light shielding paint over the entirety of the optically non-effective surface of the substrate including the ridge portion defined by the inclined chamfer and the level chafer without applying the coating liquid containing an aliphatic hydrocarbon onto the ridge portion. In this instance, the light shielding film was formed in the same manner as in Example 1 except that the coating liquid containing an aliphatic hydrocarbon was not applied. The light shielding paint and the coating liquid containing an aliphatic hydrocarbon are shown in Table 3, and the evaluation results of the optical element are shown in Table 4.

Comparative Example 2

The optical element of Comparative Example 2 was produced in the same manner as in Example 1 except that the coating liquid containing an aliphatic hydrocarbon was replaced with a lipophobic fluorine-based oil. The light shielding paint and the coating liquid containing an aliphatic hydrocarbon are shown in Table 3, and the evaluation results of the optical element are shown in Table 4.

Comparative Example 3

In Comparative Example 3, a coating liquid containing an aliphatic hydrocarbon was mixed into a light shielding paint, and this mixture was used as the paint.

Preparation of Light Shielding Paint

First, 7 g of an epoxy resin jER828 (produced by Mitsubishi Chemical) and 40 g of a titania dispersion liquid ND139 (25% by mass titania in propylene glycol monomethyl ether (PGME) produced by Tayca) were prepared. Also, 1.2 g of dye (1), VALIFAST-BLACK 3810 (produced by Orient Chemical Industries), and 3.0 g of dye (2), VALIFAST-RED 3320 (produced by Orient Chemical Industries), were prepared. In addition, 1.2 g of dye (3), VALIFAST-YELLOW 3108 (produced by Orient Chemical Industries), and 3.8 g of dye (4), VALIFAST-BLUE 2620 (produced by Orient Chemical Industries), were prepared. For the organic solvent, 22 g of 1-methoxy-2-propanol (produced by Kishida Chemical) was prepared. Furthermore, 3.2 g of hydrophobic silica (1), Aerosil R972 (produced by Nippon Aerosil), and 1.3 g of hydrophilic silica (2), Aerosil 200 (produced by Nippon Aerosil), were prepared. A fungicide, 0.5 g of Synthol M-100 (produced by SC Environmental Science), and 5 g of decane (produced by Tokyo Chemical Industry, carbon number: 10) as the material containing a saturated aliphatic hydrocarbon were prepared. These constituents prepared above were added into a vessel for stirring, and the contents in the vessel were stirred for 20 minutes with a planetary mixer HM-500 (manufactured by Keyence). Into 10 g of the resulting composition was added 1 g of an epoxy resin hardener H-30 (produced by Mitsubishi Chemical), and the mixture was stirred for 3 minutes with the planetary mixer HM-500 (manufactured by Keyence) to yield a light shielding paint.

Production of Optical Element

The light shielding paint prepared above was applied over the entirety of the optically non-effective surface including the ridge portion to form the light shielding film on the substrate, as in Comparative Example 1. The application of the light shielding paint was performed while the substrate was being spun. Then, after being dried at room temperature for 1 hour, the coating was baked at a constant temperature of 80° C. for 2 hours in a furnace to yield a light shielding film. Thus, the optical element of Comparative Example 3 was produced.

Evaluation of Ridge Portion

The thickness t [μm] of the portion of the light shielding film over the ridge portion of the resulting optical element was measured. The thickness over the ridge portion was 0.9 μm. Next, the appearance of the ridge portion was evaluated in terms of whitish bright spots. The number of white spots at the ridge portion was 73.

Then, the ridge portion was examined as described below. The optical element of Comparative Example 3 was cut into a test piece including the ridge portion and the level chamfer and a test piece not including the ridge portion. Each test piece was heated to 300° C. in the gas chromatograph mass spectrometer. The gas generated by the heating was analyzed to check whether or not the aliphatic hydrocarbon was present in the light shielding film formed over the ridge portion. In Comparative Example 3, the peak derived from the saturated hydrocarbon was observed in the portion other than the ridge portion as well as in the ridge portion. The peak of the saturated hydrocarbon in the portion other than the ridge portion was stronger than the peak of the saturated hydrocarbon in the ridge portion. The light shielding paint and the lipophilic coating liquid are shown in Table 3, and the evaluation results of the optical element are shown in Table 4.

TABLE 1

| | | | | Example 1 | Example 2 | Example 3 | Example 4 |
|---|---|---|---|---|---|---|---|
| Light shielding paint | Main component | Resin | Constituent | Epoxy | Epoxy | Epoxy | Epoxy |
| | | | Weight (g) added | 7 | 7 | 7 | 7 |
| | | Fine particles | Constituent | Titania (dispersed in propylene glycol monomethyl ether, solids content: 25 wt %) | Titania (dispersed in propylene glycol monomethyl ether, solids content: 25 wt %) | Titania (dispersed in propylene glycol monomethyl ether, solids content: 25 wt %) | Titania (dispersed in propylene glycol monomethyl ether, solids content: 25 wt %) |
| | | | Weight (g) added | 10 | 10 | 10 | 10 |
| | | Coloring agent | Constituent | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue |
| | | | Weight (g) added | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 |
| | | Organic solvent | Constituent | 1-Methoxy-2-propanol | 1-Methoxy-2-propanol | 1-Methoxy-2-propanol | 1-Methoxy-2-propanol |
| | | | Weight (g) added | 22 | 22 | 22 | 22 |
| | | Second fine particles | Constituent | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica |
| | | | Weight (g) added | (1) 3.2 (2) 1.3 | (1) 3.2 (2) 1.3 | (1) 3.2 (2) 1.3 | (1) 3.2 (2) 1.3 |
| | | Additive | Constituent | Fungicide | Fungicide | Fungicide | Fungicide |
| | | | Weight (g) added | 0.5 | 0.5 | 0.5 | 0.5 |
| | Hardener component | | Constituent | Epoxy resin hardener | Epoxy resin hardener | Epoxy resin hardener | Epoxy resin hardener |
| | | | Weight (g) added | 1 | 1 | 1 | 1 |
| Material of ridge portion defined by inclined chamfer and level chamfer | | | Lipophilic/lipophobic Constituent | Lipophilic Hexane | Lipophilic n-Octane | Lipophilic Decane | Lipophilic Tridecane |
| | | | Carbon number | 6 | 8 | 10 | 13 |

TABLE 2

| | | | | Example 5 | Example 6 | Example 7 | Example 8 |
|---|---|---|---|---|---|---|---|
| Light shielding paint | Main component | Resin | Constituent | Epoxy | Epoxy | Epoxy | Epoxy |
| | | | Weight (g) added | 7 | 7 | 7 | 7 |
| | | Fine particles | Constituent | Titania (dispersed in propylene glycol monomethyl ether, solids content: 25 wt %) | Titania (dispersed in propylene glycol monomethyl ether, solids content: 25 wt %) | Titania (dispersed in propylene glycol monomethyl ether, solids content: 25 wt %) | Titania (dispersed in propylene glycol monomethyl ether, solids content: 25 wt %) |
| | | | Weight (g) added | 10 | 10 | 10 | 10 |
| | | Coloring agent | Constituent | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue |
| | | | Weight (g) added | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 |
| | | Organic solvent | Constituent | 1-Methoxy-2-propanol | 1-Methoxy-2-propanol | 1-Methoxy-2-propanol | 1-Methoxy-2-propanol |
| | | | Weight (g) added | 22 | 22 | 22 | 22 |
| | | Second fine particles | Constituent | (1) Hydrophobic silica (2) Hydrophilic silica | (1) Hydrophobic silica (2) Hydrophilic silica | (1) Hydrophobic silica (2) Hydrophilic silica | (1) Hydrophobic silica (2) Hydrophilic silica |

TABLE 2-continued

|  |  |  | Example 5 | Example 6 | Example 7 | Example 8 |
|---|---|---|---|---|---|---|
|  | Additive | Weight (g) added | (1) 3.2 (2) 1.3 | (1) 3.2 (2) 1.3 | (1) 3.2 (2) 1.3 | (1) 3.2 (2) 1.3 |
|  |  | Constituent | Fungicide | Fungicide | Fungicide | Fungicide |
|  |  | Weight (g) added | 0.5 | 0.5 | 0.5 | 0.5 |
| Hardener component |  | Constituent | Epoxy resin hardener | Epoxy resin hardener | Epoxy resin hardener | Epoxy resin hardener |
|  |  | Weight (g) added | 1 | 1 | 1 | 1 |
| Material of ridge portion defined by inclined chamfer and level chamfer |  | Constituent | Pentacosane | Triacosane | Pentane | Hentriacontane |
|  |  | Carbon number | 25 | 30 | 5 | 31 |

TABLE 3

|  |  |  |  | Comparative Example 1 | Comparative Example 2 | Comparative Example 3 |
|---|---|---|---|---|---|---|
| Light shielding paint | Main component | Resin | Constituent | Epoxy | Epoxy | Epoxy |
|  |  |  | Weight (g) added | 7 | 7 | 7 |
|  |  | Fine particles | Constituent | Titania (dispersed in propylene glycol monomethyl ether, solids content: 25 wt %) | Titania (dispersed in propylene glycol monomethyl ether, solids content: 25 wt %) | Titania (dispersed in propylene glycol monomethyl ether, solids content: 25 wt %) |
|  |  |  | Weight (g) added | 10 | 10 | 10 |
|  |  | Coloring agent | Constituent | (1) Dye black (2) Dye red (3) Dye yellow (4) Dye blue | (1) Dye black (2) Dye red (3) Dye yellow (4) Dye blue | (1) Dye black (2) Dye red (3) Dye yellow (4) Dye blue |
|  |  |  | Weight (g) added | (1) 1.2 (2) 3.0 (3) 1.2 (4) 3.8 | (1) 1.2 (2) 3.0 (3) 1.2 (4) 3.8 | (1) 1.2 (2) 3.0 (3) 1.2 (4) 3.8 |
|  |  | Organic solvent | Constituent | 1-Methoxy-2-propanol | 1-Methoxy-2-propanol | 1-Methoxy-2-propanol |
|  |  |  | Weight (g) added | 22 | 22 | 22 |
|  |  | Second fine particles | Constituent | (1) Hydrophobic silica (2) Hydrophilic silica | (1) Hydrophobic silica (2) Hydrophilic silica | (1) Hydrophobic silica (2) Hydrophilic silica |
|  |  |  | Weight (g) added | (1) 3.2 (2) 1.3 | (1) 3.2 (2) 1.3 | (1) 3.2 (2) 1.3 |
|  |  | Additive | Constituent | Fungicide | Fungicide | Fungicide Decane (carbon number: 10) |
|  |  |  | Weight (g) added | 0.5 | 0.5 | 0.55 |
|  | Hardener component |  | Constituent | Epoxy resin hardener | Epoxy resin hardener | Epoxy resin hardener |
|  |  |  | Weight (g) added | 1 | 1 | 1 |
| Material of ridge portion defined by inclined chamfer and level chamfer |  |  | Constituent | — | Fluorine | — |
|  |  |  | Carbon number | — | — | — |

TABLE 4

Examination results of ridge portion defined by inclined chamfer and level chamfer

|  | Thickness over ridge portion (μm) | White spots at ridge portion | | Aliphatic hydrocarbon peak observed? | |
|---|---|---|---|---|---|
|  |  | Appearance | Number of white spots | Ridge portion | Other portions |
| Example 1 | 3.9 | A | 17 | Yes | No |
| Example 2 | 4.2 | A | 13 | Yes | No |
| Example 3 | 4.4 | A | 11 | Yes | No |
| Example 4 | 3.8 | A | 18 | Yes | No |

TABLE 4-continued

Examination results of ridge portion defined by inclined chamfer and level chamfer

| | Thickness over ridge portion (μm) | White spots at ridge portion | | Aliphatic hydrocarbon peak observed? | |
|---|---|---|---|---|---|
| | | Appearance | Number of white spots | Ridge portion | Other portions |
| Example 5 | 3.9 | A | 16 | Yes | No |
| Example 6 | 3.8 | A | 19 | Yes | No |
| Example 7 | 1.9 | B | 33 | Yes | No |
| Example 8 | 2.4 | B | 27 | Yes | No |
| Comparative Example 1 | 0.9 | C | 74 | No | No |
| Comparative Example 2 | 0.2 | C | 132 | No | No |
| Comparative Example 3 | 0.9 | C | 73 | Yes | Yes |

Evaluation

As is clear from the results of Examples 1 to 8, it is beneficial that an aliphatic hydrocarbon is present at the ridge portion defined by the inclined chamfer and the level chamfer of the optical element but not present at the other portion.

Also, the results of Examples 1 to 8 suggest that the beneficial thickness of the light shielding film over the ridge portion of the optical element is 1 μm or more and more beneficially 3 μm or more.

The light shielding film in Comparative Example 1 did not contain any aliphatic hydrocarbon, and, in Comparative Example 3, an aliphatic hydrocarbon was contained in the entire light shielding film. These Comparative Examples showed the same tendency in terms of the thickness of the light shielding film over the ridge portion of the element and the white spots at the ridge portion.

In Comparative Example 2, the light shielding paint was not good in wettability. Accordingly, the resulting light shielding film was as thin as 0.2 μm and the number of white spots was increased.

According to the concept of the present disclosure, a material containing a lipophilic aliphatic hydrocarbon, compatible with the light shielding paint that is the precursor of the light shielding film allows the light shielding paint to enter and fill the cracks in the ridge portion and the vicinity. The aliphatic hydrocarbon suppresses the thinning of the light shielding film over the ridge portion and contributes to achieving a good-looking optical element in which white spots at the ridge portion are reduced.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-196991 filed Oct. 10, 2017 and No. 2018-165935 filed Sep. 5, 2018, which are hereby incorporated by reference herein in their entirety.

What is claimed is:

1. An optical element comprising:
a substrate having an optically effective surface and an optically non-effective surface, the optically non-effective surface having an inclined chamfer and a level chamfer that define a ridge portion; and
a light shielding film including a first portion being disposed over the ridge portion and a second portion being disposed over another portion of the substrate different from the ridge portion,
wherein the first portion of the light shielding film contains an aliphatic hydrocarbon, and
wherein the second portion of the light shielding film does not contain the aliphatic hydrocarbon.

2. The optical element according to claim 1, wherein the ridge portion is a region on both sides up to 300 μm from an edge formed by the inclined chamfer and the level chamfer.

3. The optical element according to claim 1, wherein the aliphatic hydrocarbon is a saturated hydrocarbon.

4. The optical element according to claim 3, wherein the saturated hydrocarbon has a carbon number of 6 to 30.

5. The optical element according to claim 1, wherein the first portion of the light shielding film has, over the ridge portion, a thickness in a range of 1.0 μm to 50 μm.

6. The optical element according to claim 1, wherein the first portion of the light shielding film has, over the ridge portion, a thickness in a range of 1.0 μm to 4.9 μm.

7. A method for manufacturing the optical element according to claim 1, the method comprising: applying a liquid containing the aliphatic hydrocarbon onto the ridge portion; applying a light shielding paint onto the ridge portion and the another portion of the substrate; and drying and/or baking the light shielding paint.

8. The optical element according to claim 1, wherein the aliphatic hydrocarbon is alkane.

9. The optical element according to claim 1, wherein the aliphatic hydrocarbon is represented by a general formula $C_nH_{2n+2}$, n being an integer.

10. The optical element according to claim 1, wherein the aliphatic hydrocarbon is at least one selected from the group consisting of methane, ethane, propane, butane, pentane, hexane, heptane, octane, nonane, and decane.

11. The optical element according to claim 1, wherein the aliphatic hydrocarbon is at least one selected from the group consisting of hexane, n-octane, decane, tridecane, pentacosane, triacosane, and hentriacontane.

12. The optical element according to claim 1, wherein the substrate is made of glass, and wherein the light shielding film contains a resin selected from the group consisting of epoxy resin, alkyd resin, and acrylic resin.

13. The optical element according to claim 1, wherein the light shielding film contains particles of an inorganic material selected from the group consisting of titanium oxide, zirconium oxide, cerium oxide and tin oxide.

14. The optical element according to claim 1, wherein the light shielding film contains a pigment selected from the group consisting of carbon black, titanium black, copper oxide and iron oxide.

15. The optical element according to claim 1, wherein the light shielding film contains a dye selected from the group consisting of anthraquinone dye, phthalocyanine dye, stilbene dye, pyrazolone dye, thiazole dye, carbonium dye and azine dye.

16. The optical element according to claim 1, wherein the light shielding film is in contact with the substrate, and the ridge portion has a crack with a length of 50 μm or less and a depth of about 5 μm to 10 μm, and the first portion of the light shielding film fills in the crack.

17. An optical apparatus comprising:
an enclosure; and
an optical system including a plurality of lenses within the enclosure,
wherein one of the plurality of lenses that is disposed on a side of the optical system from which light enters includes an optical element comprising:
a substrate having an optically effective surface and an optically non-effective surface, the optically non-effective surface having an inclined chamfer and a level chamfer that define a ridge portion; and
a light shielding film including a first portion being disposed over the ridge portion and a second portion being disposed over another portion of the substrate different from the ridge portion,
wherein the first portion of the light shielding film contains an aliphatic hydrocarbon, and
wherein the second portion of the light shielding film does not contain the aliphatic hydrocarbon.

18. The optical apparatus according to claim 17, wherein the optical apparatus is a lens barrel.

* * * * *